Nov. 4, 1924.

H. L. BLOOD

CONTROL SYSTEM FOR LATHES

Filed Oct. 7 1921

Inventor
H. L. Blood.
By Wayne B Wells
Attorney.

Nov. 4, 1924.

H. L. BLOOD 1,514,421

CONTROL SYSTEM FOR LATHES

Filed Oct. 7 1921

Inventor
H. L. Blood.
By Wayne B Wells
Attorney.

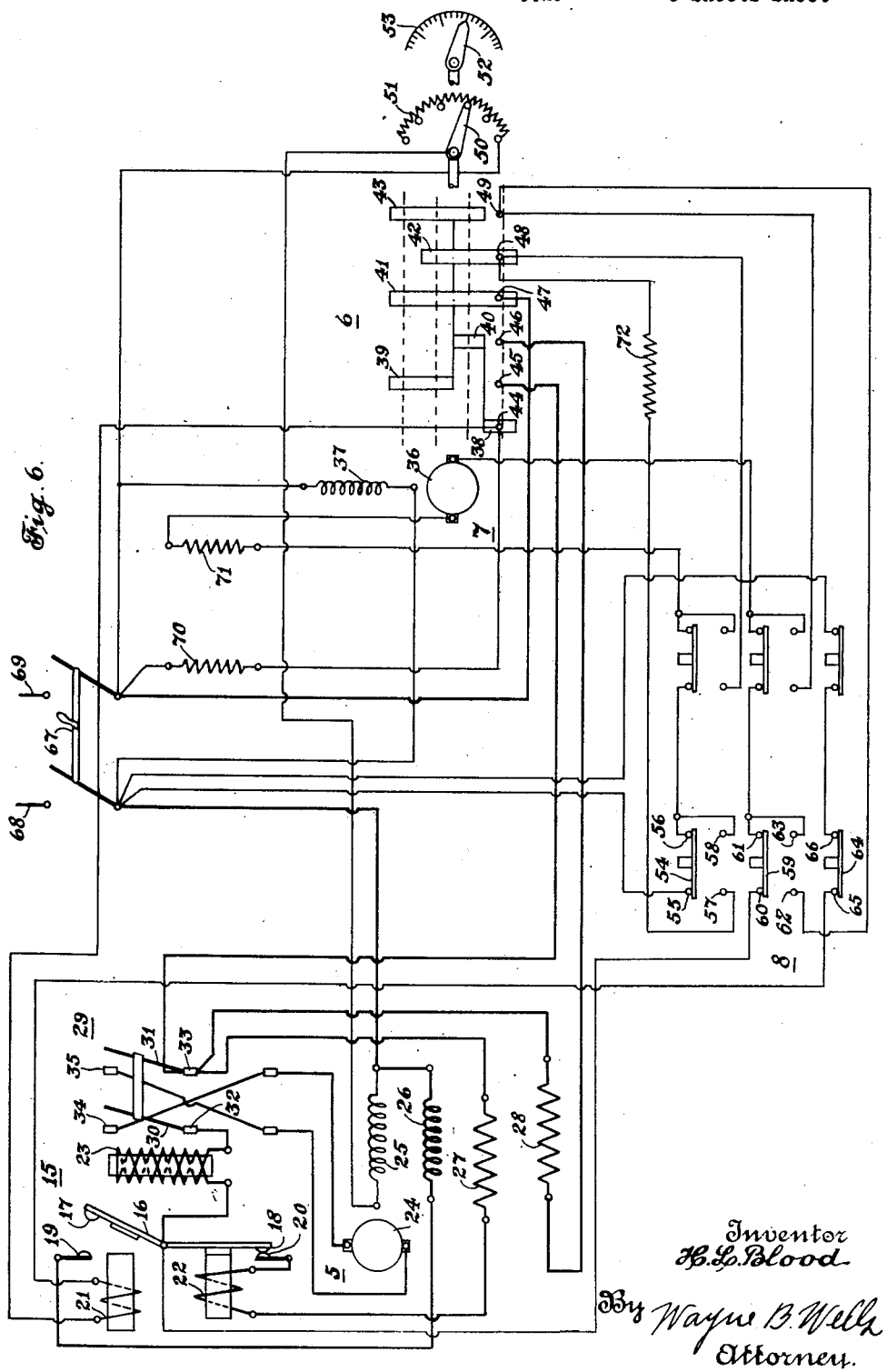

Patented Nov. 4, 1924.

1,514,421

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM FOR LATHES.

Application filed October 7, 1921. Serial No. 506,002.

*To all whom it may concern:*

Be it known that I, HAROLD L. BLOOD, a citizen of the United States, residing at North Plainfield, in the county of Somerset and State of New Jersey, have invented certain new and useful Improvements in Control Systems for Lathes, of which the following is a specification.

My invention relates to lathe control systems and particularly to control systems for operating lathes of very large sizes.

One object of my invention is to provide a lathe control system for very large lathes that shall be governed by a movable or a pendent switch disposed within reach of the lathe operator in such manner as to permit the operator to control the main driving motor from any suitable point along the lathe.

Another object of my invention is to provide a lathe with a control system that shall comprise a movable switch adapted to be carried by the lathe operator for governing the starting, stopping, accelerating and decelerating the main driving motor.

Another object of my invention is to provide a lathe with a control system that shall comprise a main driving motor, a controller for starting, accelerating and decelerating the main motor, a pilot motor for operating the controller, a main switch for opening the main motor circuit and for completing a dynamic braking circuit therethrough, and a movable switch for so operating the pilot motor and the controller as to start and accelerate the main motor and to decelerate and stop such motor and for operating the main switch to quickly stop the main motor.

A further object of my invention is to provide a pendent switch control for lathes of very large size whereby the main operating motor may be started, accelerated, decelerated and stopped from any convenient point along the lathe. The stopping of the main motor may be effected quickly by opening the circuit of the motor and completing a dynamic-braking circuit therethrough or may be slowly stopped as desired.

In operating lathes of very large size, it is desirable to control the operation of the main driving motor from a point adjacent to the position of the cutting tool which is operating on the work. The main driving motor and the controller for operating it are generally mounted on the headstock of the lathe and accordingly at times are at a considerable distance away from the the point of application of the tool to the work. If it is necessary for the operator to be stationed close to the headstock in order to operate the controller, it is difficult for him to maintain a close watch on the action of the cutting tool on the work.

In some cases, a rod has been extended along the lathe for operating the controller located on the headstock. However, such rod has limitations as it does not permit the quick stopping of the main motor. Moreover, a controller is not easily operated in the above indicated manner.

In a control system constructed in accordance with my invention, all operations of the main motor are quickly and easily controlled from any point along the lathe. A controller is provided for starting and accelerating the main motor. Moreover, the controller may be operated to decelerate and stop the main motor. A pilot motor, which may be operated in a forward and in a reverse direction, is provided for operating the controller. The energizing circuit for the pilot motor is so interlocked through the controller as to be opened when the controller is moved to either of its extreme positions. A main switch is provided for completing the operating circuit of the main motor through the controller and for completing a dynamic-braking circuit through the main motor when in a released position. A holding coil is associated with the main switch for preventing operation thereof while a dynamic-braking current is flowing through the main motor. When the controller is in the neutral or in the off position, a circuit is completed for operating the main switch preparatory to completing the main motor circuit through the controller.

A movable or pendent switch is located in any convenient position along the lathe and is provided with switch members for operating the pilot motor in a forward and in a reverse direction. Preferably, the forward movement of the pilot motor is effected at a relatively slow rate in order that the speed of the lathe may be accurately set. The movement of the pilot motor in the reverse direction is effected at a relatively rapid rate in order to quickly decelerate the main motor. The movable switch not only contains switch members for operating the pilot motor in a forward and in a reverse direction but also contains switch members for deenergizing the main switch at any time to quickly stop the main motor. Upon release of the main switch, when the controller is in an operative position, the circuit of the main motor is broken, a dynamic-braking circuit is completed therethrough, and the pilot motor is operated to quickly return the controller to neutral or off position.

Referring to the figures of the drawings:

Fig. 6 is a diagrammatic view illustrating my preferred system for controlling the lathe.

Figure 1:
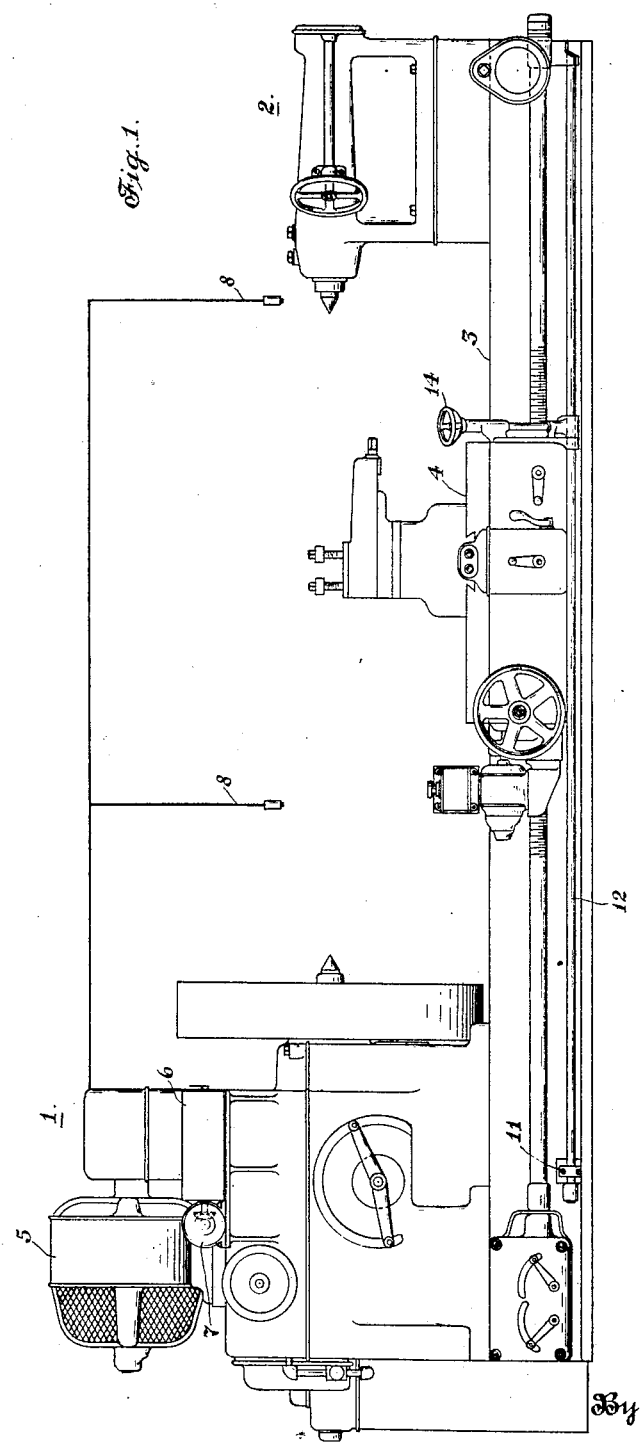
Figure 1 is a diagrammatic side elevational view of a lathe controlled in accordance with my invention.
Figure 2:
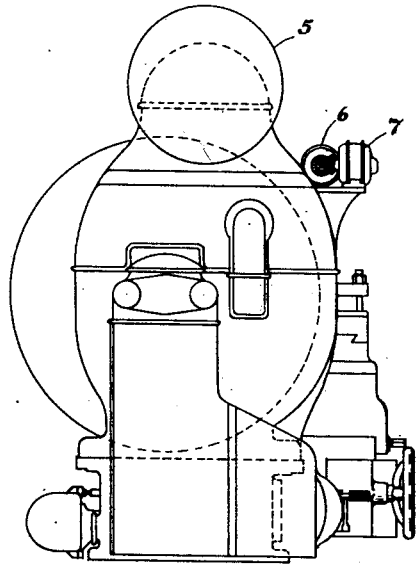
Fig. 2 is an end elevational view of the lathe shown in Fig. 1.

Referring to Figs. 1 and 2 of the drawings, a suitable lathe of large size is shown which is adapted to be controlled in accordance with my invention. The lathe comprises a headstock 1, a tailstock 2, and a bed 3 upon which the tool carriage 4 is slidably mounted. A main motor 5 is mounted on the headstock 1 and is geared in any suitable manner to the spindle of the lathe. A controller 6 is provided for governing the acceleration and the deceleration of the motor 5. The controller 6 is geared to and is operated by a pilot motor 7.

A number of movable or pendent switches 8 are distributed along the lathe in any convenient position within reach of the lathe operator. The number of such switches depends upon the length of the lathe bed, each of such pendent switches may be carried by the operator and utilized through a limited distance. Moreover, each of the pendent switches, in a manner to be hereinafter set forth, serves to control the operation of the pilot motor in a forward and in a reverse direction to start and accelerate and to decelerate and stop the main motor and to quickly stop the main motor in case of an emergency. The pendent switches 8 may be suspended in any suitable manner above the lathe.

Figure 4:
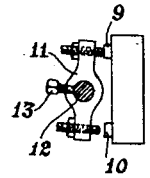
Fig. 4 is a view illustrating a modified switch.

Two push button switches 9 and 10 as shown in Fig. 4 of the drawings may be controlled by an arm 11 which is attached to a rod 12 by a set screw 13. The rod 12 extends along the bed of the lathe and is rotated or operated by a hand wheel 14 which is mounted on the tool carriage 4. The switches 9 and 10, which are controlled by the rod 12, are respectively adapted to start and accelerate the main motor and to quickly stop such motor in case of an emergency.

Inasmuch as my invention particularly relates to control systems for lathes of very large sizes and not to a lathe of any specific construction, it is deemed unnecessary to further describe in detail the lathe shown in the drawings. The lathe, which is illustrated in the drawings, is a standard and well known type and the operation thereof is believed apparent without a detailed description thereof.

Referring to Fig. 6 of the drawings, my preferred system for operating a lathe will be described. The main motor 5 is not only governed by the controller 6 but is also governed by a main switch 15. The main switch 15 comprises a switch arm 16 which carries two contact members 17 and 18. The contact member 17 is adapted to engage a stationary contact member 19, when the switch is in an operative position, to complete an operating circuit through the main motor 5. The contact member 18 is adapted to engage a stationary contact member 20 to complete a dynamic-braking circuit through the main motor when the switch is in a released position. A main magnet 21 is provided for operating the switch arm 16. A holding coil 22 is provided for maintaining the switch arm in a released position while a dynamic-braking current is flowing through the motor 5. A suitable blow-out coil 23 is provided for extinguishing the arcs formed by the contact members of the switch.

The main motor 5 comprises an armature 24, a shunt-field magnet winding 25 and a series-field magnet winding 26. A resistor 27 is provided to be connected in circuit with the armature 24 during dynamic braking. A second accelerating resistor 28 is provided in circuit with the main motor 5.

A two-pole double-throw switch 29 is provided for reversing the connections of the armature 24 in order to reverse the direction of rotation of the main motor. The switch 29 comprises two switch blades 30 and 31 which are respectively connected to contact members 32 and 33. When the switch 29 is in its upper position, the switch blades 30 and 31 respectively serve to connect the contact member 32 with a contact member 34 and the contact member 33 with a contact member 35 for effecting rotation of the main motor in one direction. When the position of the switch 29 is reversed, the direction of current flow through the armature is reversed to reverse the direction of rotation of the motor.

The pilot motor 7 comprises an armature 36 and a field-magnet winding 37. The controller 6 comprises contact segments 38 to 43, inclusive, which are adapted to engage contact members 44 to 49, inclusive. The controller is shown in the neutral or off position. A rheostat arm 50 is mounted on the shaft of the controller 6 and serves to vary the amount of the resistor 51 which is included in the circuit of the main-motor shunt-field magnet winding 25. Thus, the resistor included in circuit with the shunt-field magnet winding is varied in accordance with the position of the controller 6. As the controller 6 is moved from the neutral to the full speed position, the amount of resistance included in the circuit of the shunt-field magnet winding is increased to increase the speed of the motor. A suitable pointer 52, which operates over a dial 53, is provided for indicating the position of the controller. The pointer 52 is mounted on the controller shaft in the same manner as the rheostat arm 50. Preferably the dial 53 and the pointer 52 are located outside the base of the controller 6 and within the view of the operator of the lathe.

In the system shown in Fig. 6 of the drawings, two pendent switches are illustrated, and, inasmuch as such switches are similar in construction and operation, only one of such switches will be described in detail. The pendent switch 8 shown to the left of Fig. 6 of the drawings comprises a switch member 54 which is normally adapted to bridge two stationary contact members 55 and 56. When it is desired to operate the controller 6 to start the main motor 5, the switch member 54 is disconnected from the switch members 55 and 56 and is moved to bridge contact members 57 and 58. A switch member 59, which normally bridges contact members 60 and 61, is moved to bridge contact members 62 and 63 when the controller 6 is in an operative position and it is desired to decelerate or stop the main motor. A switch member 64, which normally bridges contact members 65 and 66, is provided for opening the circuit of the main magnet 21 of the main switch whenever a quick stopping of the main motor is desired.

A suitable switch 67 is provided for connecting the motor circuits to a supply circuit comprising conductors 68 and 69. A resistor 70 is provided in a holding circuit for the magnet 21 of the main switch 15. The resistor 70 permits sufficient current to flow through it for maintaining the main switch in an operative position but does not permit sufficient current to flow through it for operating the main switch. A resistor 71 is provided in the circuit of the pilot motor 7. A resistor 72 is provided in circuit with the pilot motor for reducing the pilot motor speed during the acceleration of the main motor. The resistor serves to effect operation of the pilot motor at different rates of speed during acceleration and deceleration of the main motor. If so desired the resistor 72 may be excluded from the pilot motor circuit and acceleration and deceleration of the main motor may be obtained at the same rate of speed.

Assuming the control apparatus to be in the position shown in the drawings, and the switches 29 and 67 to be closed, the main switch 15 is operated by the magnet 21 to effect engagement between the contact members 17 and 19. The circuit through the main magnet 21 extends from the supply conductor 68 through switch 67, contact members 65 and 66, which are bridged by the switch member 64, magnet 21, and contact members 44 and 47, which are bridged by the controller segments 38 and 41, to the supply conductor 69. When the control apparatus is in the position above indicated, the controller 6 is operated to start and accelerate the main motor 5 by operating the switch member 54. The switch member 54 is moved to bridge the contact members 57 and 58 and to complete a circuit through the pilot motor which extends from the supply conductor 68 through the switch 67, series-field magnet winding 26, contact members 17 and 19, switch arm 16, contact members 60 and 61, which are bridged by the switch member 59, pilot motor armature 36, resistor 71, contact members 57 and 58, which are bridged by the switch member 54, resistor 72, contact members 47 and 48, which are bridged by the controller segments 41 and 42, and the switch 67 to the supply conductor 69. The pilot motor is operated in a direction to move the controller 6 to the full speed position. Upon operation of the controller, the contact segment 38 disengages the contact member 44 to open the circuit previously traced through the magnet 21 of the main switch 15. However, a holding circuit is completed for the main magnet 21. The holding circuit extends from the supply conductor 68 through the contact members 65 and 66, which are bridged by the switch member 64, magnet 21, contact member 44, resistor 70, and the switch 67 to the supply conductor 69. The resistor 72 in circuit with the pilot motor 7 effects acceleration of the main motor at a reduced rate.

The controller segment 40 engages the contact member 46 for completing a circuit through the main motor 5 which extends from the supply conductor 68 through switch 67, series-field magnet winding 26, contact members 17 and 19, switch arm 16, blow-out coil 23, contact members 32 and 34, which are bridged by switch blade 30, armature 24, contact members 35 and 33, which are bridged by the switch blade 31, resistor 28, contact members 46 and 47, which are bridged by the controller segments 40 and 41, and the switch 67 to the supply conductor 69. The main motor 5 is operated for driving the spindle of the lathe. The controller segment 39 next engages the contact member 45 for short-circuiting the resistor 28 to increase the speed of the motor. At the same time, the rheostat arm 50 is being operated to increase the resistance included in the circuit of the shunt-field magnet winding 25 to correspondingly increase the speed of the main motor. When the controller is moved to the full speed position, the contact segment 42 disengages the contact member 48 to open the circuit previously traced through the pilot motor 7.

In case the controller is in the full speed position and it is desired to decelerate the main motor or decelerate and stop such motor, the switch member 59 of the pendent switch is moved to bridge the contact members 62 and 63. A circuit is completed through the pilot motor which extends from the supply conductor 68 through the switch 67, contact members 55 and 56, which are bridged by the switch member 54, resistor 71, armature 36, contact members 62 and 63, which are bridged by the switch member 59 and the contact members 47 and 49, which are bridged by the controller segments 41 and 43, and the switch 67 to the supply conductor 69. The current flow through the pilot motor is reversed and such motor is rotated in a direction to move the controller from the full speed position to the neutral position. The movement of the controller in a reverse direction decreases the amount of resistance included in circuit with the shunt-field magnet winding of the main motor and also inserts the resistor 28 in circuit with the armature 24 of the main motor. Accordingly, the speed of the main motor is reduced. Finally, when the controller is moved to the neutral or off position, the controller segment 40 disengages the contact member 46 to open the circuit of the main motor and prevent further operation thereof. When the controller is moved to the neutral or off position the circuit of the pilot motor 36 (previously traced) is opened by the controller segment 43 disengaging the contact member 49.

Assuming the controller is in the full speed position or in an operative position and it is desired to effect a quick stopping of the main motor, the switch member 64 is operated to disengage the contact members 65 and 66. The energizing circuit for the magnet 21 of the main switch 15 extends through the contact members 65 and 66, and accordingly such magnet is deenergized when the switch member 64 is moved away from the contact members 65 and 66. Upon release of the main switch 15, the energizing circuit through the main motor is opened by the separation of the contact members 17 and 19 and a dynamic-braking circuit is completed upon engagement of the contact members 18 and 20. The dynamic-braking circuit extends from one terminal of the armature 24 through the contact members 32 and 34, which are bridged by the switch blade 30, blow-out coil 23, switch arm 16, contact members 18 and 20, holding coil 22, resistor 27, and the contact members 33 and 35, which are bridged by the contact segment 31, to the other terminal of the armature 24. Thus the motor is quickly stopped.

Upon release of the main switch, a circuit is completed through the pilot motor for operating such motor to return the controller 6 to the neutral position. The circuit through the pilot motor extends from the supply conductor 68 through the switch 67, contact members 55 and 56, which are bridged by the switch member 54, resistor 71, armature 36, contact members 60 and 61, which are bridged by the switch member 59, contact arm 16, the armature 24 and the resistor 27 in parallel, contact members 45 and 47, which are bridged by the controller segments 39 and 41, and the switch 67 to the supply conductor 69. Thus, the pilot motor is operated in a direction to return the controller to the off or neutral position. In case the contact member 45 is not in engagement with the controller segment 39, the circuit for the pilot motor will be completed through the resistor 28 and the controller segment 40 of the controller 6.

The switch members 54, 59 and 64, which are embodied in one pendent switch, control the operation of the pilot motor 7 in a forward and in a reverse direction to accelerate or decelerate the main motor and also to control the main switch 15 for effecting a quick stopping of the main motor. The switch member 54, as heretofore set forth, completes a circuit through the pilot motor for so operating the controller 6 as to start the main motor and effect acceleration thereof. The switch member 59 serves to complete a circuit through the pilot motor for moving the controller from an operative position to the neutral or off position thus decelerating and if desired stopping the main motor. The switch member 64 releases the main switch 15 to open the circuit of the main motor and to complete a dynamic-braking circuit therethrough. The release of the main switch also completes a circuit through the pilot motor for effecting the return of the controller to neutral or off position. The pendent switch which comprises the switch members 54, 59 and 64 is located at any convenient position along the lathe and may be carried by the operator of the lathe through a limited distance. As shown in Fig. 1, a number of such pendent switches are distributed along the lathe. Each of such pendent switches operate in the manner above indicated.

In Figs. 1 and 4, two push button switches 9 and 10 are shown operated by the rod 12. Such push button switches may serve to control two of the switch members indicated in the pilot switch 8 in Fig. 6 of the drawings. Thus, one push button switch may serve to operate the pilot motor to start and accelerate the main motor and the other push button switch may serve to release the main switch 15.

Figure 3:
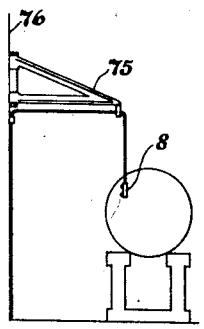
Fig. 3 is a view showing one method of supporting the pendent switch.

Referring to Fig. 3 of the drawings, a pendent switch 8 is indicated as being hung on a pivotal support 75. The support 75 is pivotally mounted in any suitable manner on the wall 76. The operator who is assumed to take a position between the wall and the lathe may carry the pendent switch 8 through a limited distance along the lathe. Thus, the operator may control the operation of the lathe while maintaining a position close to the cutting tool.

Figure 5:
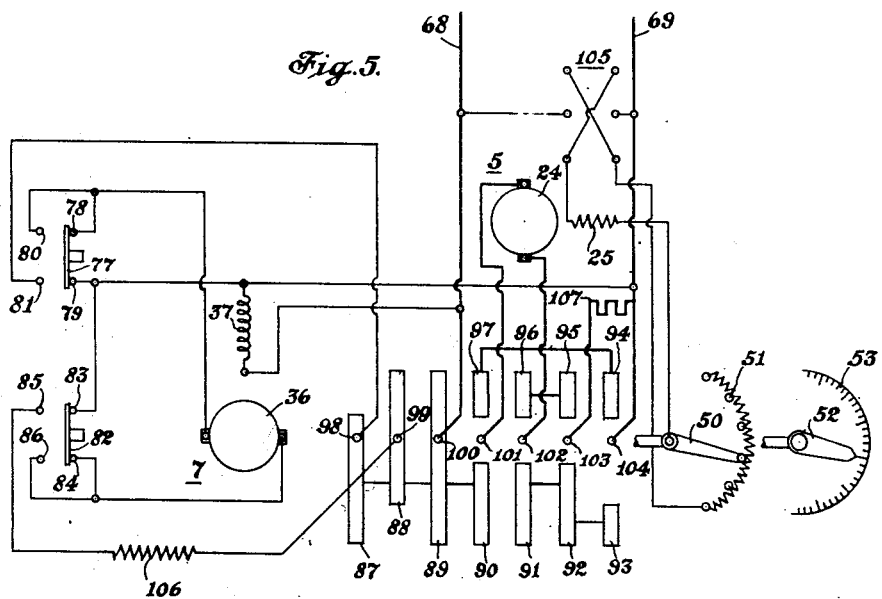
Fig. 5 is a diagrammatic view of one control system for operating the lathe.

Referring to Fig. 5 of the drawings, a modification of my invention is illustrated wherein the main switch 15 is dispensed with and the dynamic-braking circuit is completed through a controller. The main motor and the pilot motor will be indicated by reference characters similar to those used to designate like parts in Fig. 6 of the drawings. The pendent switch for controlling the system illustrated in Fig. 5 of the drawings comprises a switch member 77, which normally bridges contact members 78 and 79 and which is adapted to bridge contact members 80 and 81 when it is desired to operate the main motor at a slower speed or to stop the same. A second switch member 82 normally bridges contact members 83 and 84. The switch member 82 is moved to bridge contact members 85 and 86 when it is desired to start the main motor or to operate it at a faster speed. The controller, which governs the operation of the motor 5, comprises contact segments 87 to 97, inclusive, which are adapted to engage contact members 98 to 104, inclusive.

A two-pole double-throw switch 105 is provided for reversing the direction of current flow through the main-motor shunt-field magnet winding 25 to reverse the direction of rotation of the main motor at will. A resistor 106 is provided in circuit with the pilot motor 7 for reducing the speed of the pilot motor during the acceleration of the main motor. An accelerating resistor 107 is provided in circuit with the armature 24 of the main motor 5.

Assuming the controller to be in a neutral or off position, the main motor may be started and accelerated by operating the switch member 82 of the pilot switch. The movement of the switch member 82 to bridge the contact members 85 and 86 completes a circuit through the pilot motor which extends from the supply conductor 68 through the contact members 99 and 100, which are bridged by the controller segments 88 and 89, resistor 106, contact members 85 and 86, which are bridged by the switch segment 82, armature 36 of the pilot motor and contact members 78 and 79, which are bridged by the switch segment 77, to the supply conductor 69. The pilot motor is operated in a direction to move the controller to start and to accelerate the main motor 5.

The contact segments 90, 91 and 92 of the controller first engage the contact members 101, 102 and 103 for completing a circuit through the main motor 5 which extends from the supply conductor 68 through the contact members 100 and 101, which are bridged by the contact segments 89 and 90, armature 24, contact members 102 and 103, which are bridged by the contact segments 91 and 92, and the resistor 107 to the supply conductor 69. In the full-speed position, the contact segment 93 engages the contact member 104 to short circuit the resistor 107 and to increase the speed of the main motor. Moreover, the rheostat arm 50, which is attached to the shaft of the controller, increases the amount of the resistance 51 included in the circuit of the shunt field magnet winding 24 as the controller is moved to the full speed position. When the controller is moved to the full speed position, the circuit through the pilot motor 7 is opened by the contact segment 88 disengaging the contact member 99.

If the controller is in an operative position and it is desired to stop the main motor, the switch member 77 of the pilot switch is operated to bridge the contact members 80 and 81. A circuit is completed through the pilot motor 7 which extends from the supply conductor 68 through the contact members 100 and 98, which are bridged by the controller segments 87 and 89, contact members 80 and 81, which are bridged by the switch member 77, armature 36 of the pilot motor, contact members 83 and 84, which are bridged by the switch member 82, to the supply conductor 69. The pilot motor is operated in a reverse direction for returning the controller to neutral position and if necessary to the braking position. Upon return of the controller to neutral position, the circuit of the main motor is broken and upon moving the controller to the braking position, a circuit is completed through the main motor armature which extends from one terminal of the armature through the contact members 101 and 104, which are bridged by the controller segments 94 and 97, resistor 107, and the contact members 102 and 103, which are bridged by the controller segments 95 and 96 to the other terminal of the armature. Thus, a dynamic braking circuit is completed through the armature to effect a quick stopping of the motor.

Modifications in the system, and in the arrangement and location of parts may be made within the spirit and scope of my invention and such modifications are intended to be covered by the appended claims.

What I claim is:

1. In a lathe control system, the combination comprising a lathe, a main driving motor mounted on the headstock for operating the spindle of the lathe, a controller for governing the operation of the main motor, and means comprising a switch movable relatively to and mounted independently of the lathe for governing the controller to start and to accelerate the motor to any desired speed and to decelerate the motor either to any desired speed or to stop it.

2. In a lathe control system, the combination comprising a lathe, a main driving motor mounted on the headstock for operating the spindle of the lathe at various speeds, a controller for governing the operation of the main motor, a pilot motor for operating said controller, a portable switch for effecting an emergency stop of the main motor and for so controlling the pilot motor as to start and stop the main motor, and means controlled by said switch for operating the pilot motor at different speeds in opposite directions.

3. In a lathe control system, the combination comprising a lathe, a main motor mounted on the headstock for operating the spindle of the lathe at various speeds, a portable switch movable to any desired position along the bed of the lathe by the lathe operator, and means controlled by said switch for starting the motor, for effecting armature and field control of the motor to accelerate it to any desired speed, for decelerating the motor to any desired speed, and for effecting an emergency stop of the motor at any time.

4. In a control system for a lathe, the combination comprising a main driving motor mounted on the headstock for operating the spindle of the lathe, a controller for starting, stopping and accelerating the main motor, a pilot motor for operating said controller, and a portable switch movable along the lathe for operating the pilot motor at a relatively slow speed in one direction to start and accelerate the main motor to various operating speeds and for operating the pilot motor at a relatively rapid speed in an opposite direction to decelerate or stop the main motor.

5. In a control system for a lathe, the combination comprising a main driving motor for operating the spindle of the lathe, a controller for starting and accelerating the main motor, a pilot motor for operating said controller, a main switch for opening the main motor circuit and for completing a dynamic-braking circuit, circuit connections for operating the main switch upon movement of the controller to an off position and when no dynamic braking current is flowing, and a portable switch for operating the pilot motor at a relatively slow speed in one direction to start and accelerate the main motor, for operating the pilot motor at relatively rapid rate in an opposite direction to decelerate and stop the main motor.

6. In a control system for a lathe, the combination comprising a main driving motor having an armature and a field-magnet winding for operating the spindle of the lathe, resistors adapted to be inserted in the circuits of the armature and the field-magnet winding, a controller for starting and stopping the motor, said controller connected to and serving to vary each of said resistors to effect acceleration of the main motor, a pilot motor for operating said controller, and a portable switch for effecting an emergency stop of the main motor and for operating the pilot motor to accelerate or decelerate the main motor.

7. In a control system for a lathe, the combination comprising a main driving motor having an armature and a field-magnet winding for operating the spindle of the lathe, resistors adapted to be inserted in the circuits of the armature and the field-magnet winding, a controller for starting and stopping the motor and for operating it at different speeds, said controller connected to and serving to vary each of said resistors to effect acceleration of the main motor, a pilot motor for operating said controller, and a portable switch for operating the pilot motor at a relatively slow speed in one direction to start and accelerate the main motor to any desired speed for operating the pilot motor at a relatively rapid speed to decelerate or to stop the main motor.

8. In a lathe control system, the combination with a lathe, a main motor mounted on the headstock for operating the spindle of the lathe, means comprising a controller for starting and accelerating the motor and for effecting a dynamic-braking circuit to stop the motor, and a pilot motor for operating the controller, of means comprising a portable switch adapted to be moved along the bed of the lathe for effecting an emergency stop of the main motor and for governing the operation of the pilot motor in a forward and in a reverse direction to accelerate or decelerate the main motor.

9. In a lathe control system, the combination with a lathe, a main motor for operating the spindle of the lathe, a controller for governing the acceleration of the main motor, a main switch for stopping the main motor and for completing a dynamic-braking circuit therethrough, and circuit connections for operating the main switch upon movement of the controller to an off position and when no dynamic braking current is flowing, of a pilot motor for operating said controller, the circuit for said pilot motor being so connected to the controller as to be opened when the controller is moved to the full speed position, and a portable switch for completing a circuit through the main switch to operate the pilot motor when the controller is in neutral position.

10. In a lathe control system, the combination with a lathe, a main motor for operating the spindle of the lathe, a controller for governing the main motor, and a main switch for stopping the main motor and for completing a dynamic-braking circuit therethrough, of a pilot motor for operating said controller, the circuit for said pilot motor being so interlocked through said controller as to be opened when the controller is moved to full speed position and to be closed when the main switch is released and the controller is in an operative position, and a portable switch for completing a circuit through the pilot motor when the controller is in neutral position, for releasing the main switch, and for completing a circuit through the pilot motor when the controller is in any operative position.

11. In a lathe control system, the combination with a lathe, a main motor for operating the spindle of the lathe, field and armature resistors, a controller for starting the motor and for varying the armature and field resistors to accelerate the motor, and a main switch for stopping the main motor and for completing a dynamic-braking circuit therethrough, of a pilot motor for operating said controller, the circuit for said pilot motor being so interlocked through the controller as to be opened when the controller is in position for operating the main motor at full speed, said pilot motor having an energizing circuit completed therethrough by the release of the main switch when the controller is in an operative position, and a portable switch for controlling the pilot motor and the main switch.

12. In a lathe control system, the combination with a lathe, a main motor for operating the spindle of the lathe, armature and field resistors, a controller for starting the main motor and for varying the armature and the field resistors to accelerate the main motor, and a main electromagnetic switch for opening the circuit of the main motor and for completing a dynamic-braking circuit, the energizing circuit for said switch being so interlocked through said controller as to operate it when the controller is in neutral position, of a pilot motor for operating said controller in a forward and in a reverse direction, the circuit for said pilot motor being opened by the controller when the main motor is operating at full speed and is closed when the main switch is released and the controller is in an operative position, and a portable switch for completing a circuit through the main switch to operate the pilot motor when the controller is in neutral position, for completing a pilot-motor circuit through the controller when it is desired to operate the pilot motor to lower the main motor speed and for opening the energizing circuit of the main switch to stop the main motor when the controller is in an operative position.

13. In a control system for operating a machine tool, the combination with a main motor, a controller for governing the main motor, a pilot motor for operating said controller, and a main switch, an energizing circuit for the main switch being completed upon movement of the controller to the off position, of a portable switch for opening the circuit of the main switch to effect a quick stopping of the motor, for operating the pilot motor in one direction to start and accelerate the main motor, and for operating the pilot motor in an opposite direction to decelerate and stop the main motor.

14. In a control system for operating a machine tool, the combination with a main motor, a controller for governing the acceleration of the main motor, and a main switch for stopping the main motor and for completing a dynamic-braking circuit therethrough, an energizing circuit for the main switch being completed upon movement of the controller to an off position, of a pilot motor for operating said controller, and means for operating the pilot motor at different speeds in opposite directions, said controller serving to open the pilot motor circuit when moved either to full speed position or neutral position.

15. In a control system for operating a machine tool, the combination with a main motor, a controller, means comprising resistors governed by the controller for effecting armature and field control of the main motor, and a pilot motor for operating said controller, of means for operating the pilot motor at a relatively rapid rate in one direction and at a relatively slow rate in an opposite direction, and a main switch serving to complete an energizing circuit for the main motor through the controller when in one position and to complete a dynamic-braking circuit through the main motor and to operate the pilot motor to return the controller to neutral position when in the opposite position.

In testimony whereof, I hereto affix my signature.

HAROLD L. BLOOD.